United States Patent [19]
Claytor

[11] Patent Number: 5,766,732
[45] Date of Patent: Jun. 16, 1998

[54] MOISTURE RESISTANT FROZEN FOOD PACKAGING USING AN OVER-PRINT VARNISH

[75] Inventor: Robinson Camden Perkins Claytor, Covington, Va.

[73] Assignee: Westvaco Corporation, New York, N.Y.

[21] Appl. No.: 660,671

[22] Filed: Jun. 5, 1996

[51] Int. Cl.[6] .................................................. B32B 3/00
[52] U.S. Cl. .......................... 428/195; 428/204; 428/330; 428/411.1; 428/454; 428/478.4; 428/500; 428/507; 427/256
[58] Field of Search .................. 428/34.2, 35.7, 428/195, 411.1, 507, 511, 913, 914, 204, 330, 454, 478.4, 500; 156/195; 427/256

[56] References Cited

U.S. PATENT DOCUMENTS

| | | |
|---|---|---|
| 4,146,033 | 3/1979 | Ide et al. . |
| 4,170,681 | 10/1979 | Edwards et al. . |
| 4,595,611 | 6/1986 | Quick et al. . |
| 4,830,902 | 5/1989 | Plantenga et al. . |
| 4,900,594 | 2/1990 | Quick et al. ................... 428/34.2 |
| 4,933,212 | 6/1990 | Gerstner et al. . |
| 5,008,144 | 4/1991 | Baker et al. . |
| 5,032,424 | 7/1991 | Carlson et al. . |
| 5,035,946 | 7/1991 | Baker et al. . |
| 5,041,941 | 8/1991 | Carter et al. . |
| 5,228,272 | 7/1993 | Calvert et al. . |
| 5,252,384 | 10/1993 | Bothe et al. . |
| 5,266,384 | 11/1993 | O'Dell et al. . |
| 5,286,547 | 2/1994 | Tyerman . |
| 5,309,839 | 5/1994 | Hartung et al. . |
| 5,344,704 | 9/1994 | O'Dell et al. . |
| 5,356,070 | 10/1994 | Rigby . |
| 5,498,452 | 3/1996 | Powers ........................ 428/34.2 |
| 5,573,693 | 11/1996 | Lorence et al. ............... 219/730 |

Primary Examiner—William Krynski
Attorney, Agent, or Firm—J. R. McDaniel; R. L. Schmalz

[57] ABSTRACT

This invention relates to moisture resistant frozen food packaging using highly-sized paperboard and press applied moisture resistant over-print varnishes. Such structures of this type, generally, employ a moisture-resistant coating which is placed between the food product and the paperboard in order to provide a barrier for the food from the board and also to prevent the paperboard from absorbing moisture. Also, edge-wick moisture absorption is minimized by the use of the highly-sized sheet.

18 Claims, 2 Drawing Sheets

MOISTURE RESISTANT FROZEN FOOD PACKAGING USING AN OVER-PRINT VARNISH

BACKGROUND OF THE INVENTION

1. Field of the Invention

This invention relates to moisture resistant frozen food packaging using highly-sized paperboard and press applied moisture resistant over-print varnishes. Such structures of this type, generally, employ a moisture-resistant coating which is placed between the food product and the paperboard in order to provide a barrier for the food from the board and also to prevent the paperboard from absorbing moisture. Also, edge-wick moisture absorption is minimized by the use of the highly-sized sheet.

2. Description of the Related Art

Cartons which are used for distributing, marketing and, in some cases, heating portions of prepared foods are fabricated with a paperboard structural substrate. In some applications, the paperboard may be coated with a polymeric or similar material for barrier or aesthetic purposes. A water-resistant coating is placed between the food product and the paperboard to provide a barrier for the food from the board and, also, to prevent the paperboard from absorbing moisture from the food. In cases where the product is continuously kept frozen, this is usually adequate. However, markets in developing countries where electricity is expensive and freezers are turned off at night, the outside and inside surfaces of the packages are often exposed to liquid water from condensation and thawing which can ruin the functionality of the package and its appearance. Different methods of rectifying this problem have led to trade-offs in print quality, ease of printing and water resistance of the package.

Current frozen food packaging using paperboard consists of paperboard with extruded polymers or wax on the food contact side. This allows the outside of the carton to be used as a printing surface for the graphics desired by the retailer. However, under some conditions as discussed above, the package is subjected to high moisture or liquid water that penetrates the paperboard through the printed surface and through "edge-wicking". Water absorption can ruin the package appearance by warping the board, thereby causing the coating/ink surface to flake and reducing package integrity through paperboard delamination.

Another package design utilizes an extruded polymer or wax application on both sides of the paperboard. This design prevents water penetration through the paperboard, but does not address edge-wicking. It is also less desirable since it requires the package to have a printed overwrap or the printing be performed on a polymer or wax surface. Also, it is well known that printing on a polymer or wax surface may result in the graphic quality being compromised as compared to printing on a clay-coated paperboard surface. It is also less desirable for the printer/converter to print on a polymer/wax surface because this requires special inks, equipment and other infrastructure.

A further package design involves laminating a film on the outside over the printed or unprinted paperboard. This requires an additional step beyond printing which increases cost and rejection rate on the package. Exemplary of such designs are U.S. Pat. No. 4,595,611 ('611) to Quick et al., entitled "Ink-Printed Ovenable Food Containers" and U.S. Pat. No. 4,830,902 ('902) to Plantenga et al., entitled "Paper Object Printed With Ink and Coated With A Protective Layer". While the '611 patent discloses the use of an outside film over the printed or unprinted paperboard, the '611 reference is primarily concerned with the use of a sulfonated polyester to improve adhesion of a food-contact, heat sealable polyester layer. The use of an over-print varnish to protect printing is discussed, but the use of this coating to improve the functioning of the package in terms of watering resistance is not mentioned.

With respect to the '902 patent, again while it discusses the use of a film on the outside over the printed paperboard, it does not teach any mention of moisture resistance of the applied coating, the sizing level of the paperboard substrate or any type of packaging. Also, the '902 patent discloses the use of an over-print varnish to protect the printing on a paper substrate, but not as a functional characteristic of a frozen-food package. Finally, ovenability is not mentioned. Therefore, a more advantageous package, then, would be presented if the over-print varnish would improve the water resistance of the package, while at the same time protecting the printing on the paper substrate.

It is apparent from the above that there exists a need in the art for an over-print varnish which is capable of being coated on a frozen-food package, and which at least equals the printing protection characteristics of the known over-print varnishes, but which at the same time is able to increase the water resistance and reduce the edge-wicking of the package.

It is a purpose of this invention to fulfill this and other needs in the art in a manner more apparent to the skilled artisan once given the following disclosure.

SUMMARY OF THE INVENTION

Generally speaking, this invention fulfills these needs by providing a composite structure for a frozen-food paperboard package having decreased edge-wicking and including an over-print varnish for increasing moisture resistance, comprising a water resistant, over-print varnish layer, a print graphics layer located interior to the varnish layer, a layer of particulate minerals located interior to the print graphics layer, a paperboard substrate located interior to the layer of particulate minerals, and a food-contact polymer layer located interior to the paperboard substrate.

In certain preferred embodiments, the water-resistant, over-print varnish is press-applied over the graphics layer. Also, the paperboard substrate is a highly-sized paperboard to prevent edge-wicking. Finally, a layer of a hold-out varnish may be located between the water-resistant varnish layer and the print graphics layer to further increase water-resistance.

In another further preferred embodiment, moisture resistance and edge-wicking of the paperboard package composite structure are substantially improved through the use of the over-print varnish and the highly-sized paperboard.

The preferred package, according to this invention, offers the following advantages: lightness in weight; ease of assembly; good stability; excellent durability; good economy; reduced edge-wicking; and increased moisture resistance. In fact, in many of the preferred embodiments, these factors of ease of assembly, durability, reduced edge-wicking, and increased moisture resistance are optimized to the extent that is considerably higher than heretofore achieved in prior, known package composite structure.

BRIEF DESCRIPTION OF THE DRAWING

The above and other features of the present invention, which will become more apparent as the description proceeds, are best understood by considering the following detailed description in conjunction with the accompanying drawings, in which.

DETAILED DESCRIPTION OF THE INVENTION

The present invention focuses on providing moisture/water resistance of a packaging material by addressing the water absorption through the edge (edge-wick) and through both surfaces separately. The food-contact surface may provide water resistance by using a multitude of polymers, waxes or coatings that are appropriate for this intended use (heat resistant for ovenable cartons, etc.). This is no different than the methods previously described. Edge-wick moisture absorption is minimized by use of a highly-sized substrate such as liquid packaging paperboard.

Moisture absorption from the outside of cartons prepared from the packaging material is minimized, according to the present invention, by using a water-resistant varnish that is applied to a paperboard substrate subsequent to printing the desired graphics, preferably, on the same printing press. This methodology allows for a clay-coated paperboard to be used so that printability is enhanced. The clay-coating will also provide some "hold-out" for the water-resistant varnish so that a continuous film may be applied while using low coat weights of the varnish, thus, resulting in a lower cost package. It also avoids the costly extra step of laminating a water-resistant film to the printed side. The structure of the package is described more completely below with reference to FIG. 1.

Figure 1:
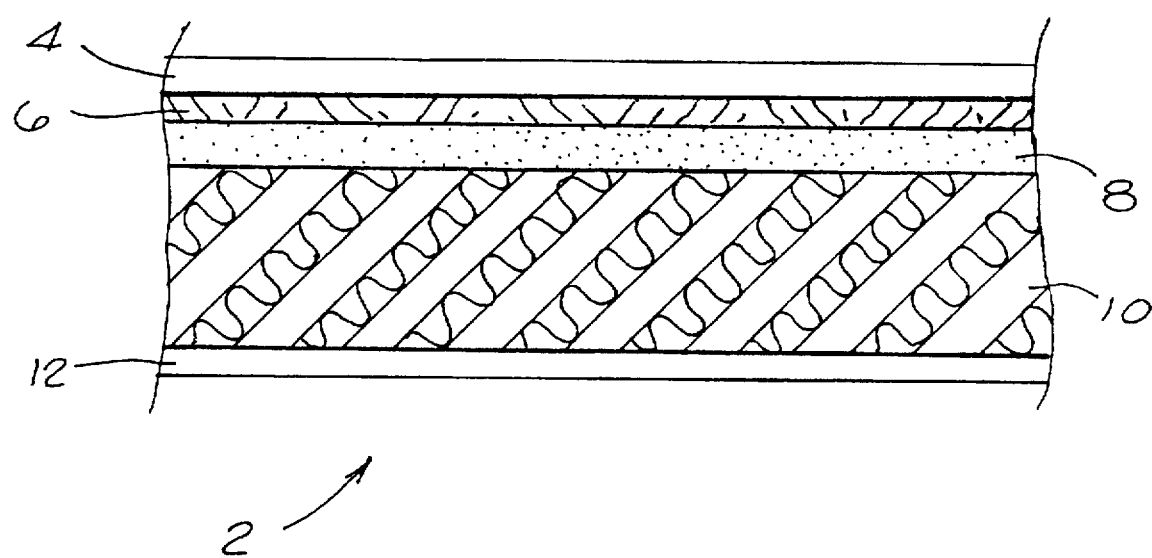
FIG. 1 is a cross-sectional illustration of a coated substrate used for a frozen-food package including an over-print varnish for increasing moisture resistance, according to the present invention.

With reference to FIG. 1, there is illustrated an advantageous coated substrate for use in a frozen-food package including an over-print varnish for increased moisture resistance and decreased edge-wicking. More particularly, composite structure 2 includes, in part, from exterior to interior, over-print varnish layer 4, print graphics layer 6, particulate mineral layer 8, highly-sized paperboard substrate 10, and food contact polymer layer 12.

Over-print varnish layer 4, preferably, is applied by a printing press at an application rate or coat weight of at least 1 pound per 1000 ft². Preferably, any suitable acrylic-based type of over-print varnish can be used. Particulate mineral layer 8 is, preferably, a fluidizied bed of minerals such as coating clay, calcium carbonate, and/or titanium dioxide with starch or adhesive which is smoothly applied to a traveling web surface. Successive densification and polishing by calendering finishes the mineral coated surface to a high degree of smoothness and a superior graphics print surface. Substrate 10 is, typically, paperboard constructed from an 0.018" thick solid bleached sulfate (SBS) sheet. Definitively, the term paperboard describes paper within the thickness range of 0.008 to 0.028". The invention is relative to the full scale of such a range as applied to packaging and beyond. Substrate 10, preferably, is sized according to conventional techniques and at a sizing application rate of approximately 0.8% of rosin size or 0.4% alkyl ketene dimer size. Food contact polymer layer 12 can include any suitable food contact polymer such as, but not limited to, polyethylene terephthalate, polypropylene, polyethylene, and nylon.

Finally, layer 12, preferably, is applied at a rate of approximately 19 pounds per 1000 ft².

Figure 2:
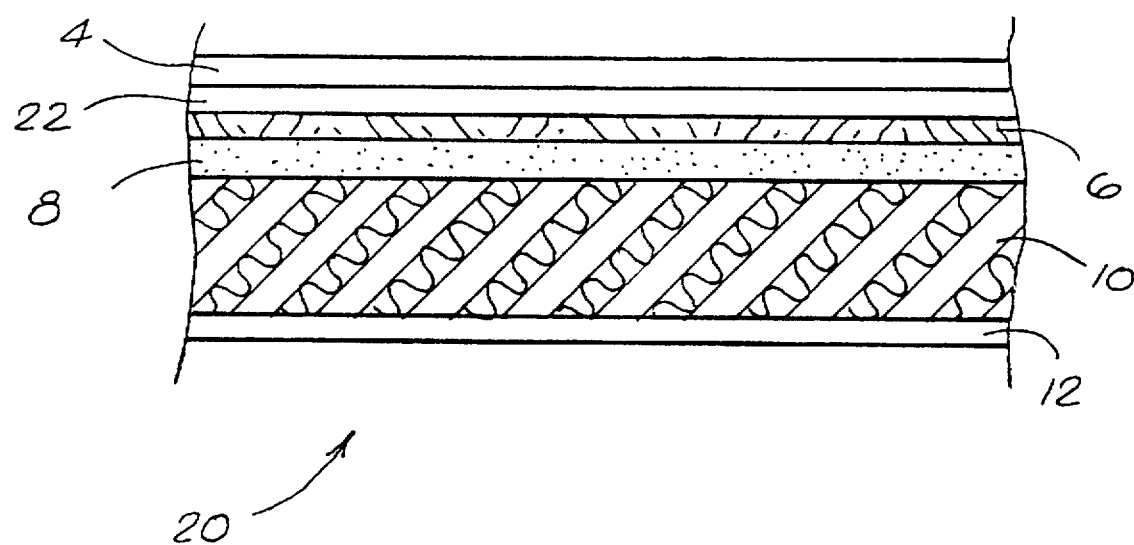
FIG. 2 is a cross-sectional illustration of another embodiment of a coated substrate, according to the present invention.

With respect to FIG. 2, there is illustrated another embodiment of a composite structure 20. Structure 20 includes, in part, water-resistant varnish layer 4, a second hold-out varnish layer 22, print graphics layer 6, particulate mineral layer 8, paperboard substrate layer 10, and food contact polymer layer 12. Layers 4, 6, 8, 10, and 12, preferably, are constructed of the same materials as their corresponding layers in composite structure 2.

However, composite structure 20 includes an additional hold-out varnish layer 22 located between water-resistant varnish layer 4 and print layer 6. Layer 22, preferably, is constructed of any suitable overprint varnish. Also, layer 22 is applied at a coat weight of approximately 1 pound per 1000 ft². It has been determined that by applying layer 22 prior to the application of layer 4, a significant improvement in water resistance can be obtained. The improvement is shown in the Table, below.

Composite structures 2 and 20 are preferable to most printers/converters since they involve printing on a clay coated surface rather than on a polymer surface. As discussed above, printing on polymers involves special inks, equipment and requires extra drying time to pass through. It also often involves extra warehouse space to allow pallets of printed substrate to dry prior to converting or additional printing. Without additional warehousing to allow drying, printing on polymers often excludes the use of two passes through the printing press which reduces the type of presses that can be used and the number of colors that can be applied to a package. Printing on a clay-coated surface, then applying the water-resistant varnish or a water resistant varnish and a hold-out varnish, according to the present invention, allows the printer to pursue various options in printing graphics. This is because the press application of the varnishes eliminates an extra converting step that is currently necessary with many packages.

Laboratory trials using water-resistant varnishes on ovenable paperboard (clay-coated solid bleached sulfate (SBS) with a polyethylene terephthalate coating) and liquid packaging paperboard with polyethylene were conducted. The results, in the Table below, demonstrate how the water-resistant varnish and the use of a highly-sized paperboard have superior water-resistance as compared to standard ovenable paperboard.

TABLE

| Sample | % water pick-up* |
| --- | --- |
| PET-coated paperboard (control) | 51% |
| PET-coated liquid packaging paperboard (control) | 52% |
| PET-paperboard with varnish | 28% |
| PET-liquid packaging paperboard with varnish | 13%** |
| Polymer-coated both side paperboard | >5% |

*% water pick up is defined as the weight of water absorbed by the paperboard after 1 hour of submersion divided by the initial weight of the paperboard. 15% is the limit established by a typical customer/converter.
**13% is an average value taken from values ranging from 7% to 25%. The 25% data point is believed to be due to inadequate coat weight resulting in a discontinuous film layer.

As can be seen from the data in the TABLE, the use of water resistant varnish with various types of paperboard decreases the percentage of water pick-up, i.e., increase the water-resistance. Even though the water pick-up of the varnished aseptic paperboard is not as low as the polymer-both-side paperboard, the converting and printing advantages of the present invention make it more desirable for the customer and the ultimate end user. As discussed above, this is due to the cost, ease of manufacturing and superior graphics when printing on a clay surface as compared to polymer-on-wax surface.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A composite structure for a frozen-food paperboard package having decreased edge-wicking and including an over-print varnish for increasing moisture resistance comprised of:

a water resistant, over-print varnish layer;

a print graphics layer located interior to the varnish layer;

a layer of particulate minerals located interior to the print graphics layer wherein said particulate minerals layer has been surface treated by successive densification and polishing by calendering;

a highly-sized paperboard substrate located interior to the layer of particulate minerals wherein said sizing material is further comprised of approximately 0.8% rosin acid or 0.4% alkyl ketene dimer; and a food-contact polymer layer located interior to the paperboard substrate.

2. The structure, as in claim 1, wherein said varnish layer is further comprised of:

an acrylic-based varnish.

3. The structure, as in claim 1, wherein said particulate mineral layer is further comprised of:

clay.

4. The structure, as in claim 1, wherein said particulate mineral layer is further comprised of:

calcium carbonate.

5. The structure, as in claim 1, wherein said polymeric layer is further comprised of:

polyethylene terephthalate.

6. The structure, as in claim 1, wherein said polymeric layer is further comprised of:

polypropylene.

7. The structure, as in claim 1, wherein said polymeric layer is further comprised of:

polyethylene.

8. The structure, as in claim 1, wherein said polymeric layer is further comprised of:

nylon.

9. The structure, as in claim 1, wherein said structure is further comprised of:

a hold-out varnish layer located substantially between said over-print varnish layer and said print graphics layer.

10. The structure, as in claim 9, wherein said hold-out layer is further comprised of:

an over-print varnish suitable to cover inks or graphics.

11. A method for constructing a composite structure for a frozen-food paperboard package having decreased edge-wicking and including an over-print varnish for increasing moisture resistance, wherein said method is comprised of the steps of:

highly sizing a paperboard substrate having first and second sides to decrease edge-wicking wherein said sizing material is further comprised of approximately 0.8% rosin acid or 0.4% alkyl ketene dimer;

coating said first side of said substrate with a layer of a food contact polymer;

coating said second side of said substrate with a layer of particulate minerals surface treating said layer of particulate minerals;

coating said surface treated layer of said particulate minerals with a layer of print graphics; and coating said graphic layers with a layer of an over-print varnish to increase moisture resistance.

12. The method, as in claim 11, wherein said coating steps are further comprised of the step of:

press-applying said food-contact polymer, said particulate minerals, said graphics and said over-print varnish with a printing press.

13. The method, as in claim 11, wherein said food-contact polymer layer is coated at a coat weight of approximately 19 lbs per 1000 ft$^2$.

14. The method, as in claim 11, wherein said over-print varnish layer is applied at a coat rate of at least 1 pound per 1000 ft$^2$.

15. The method, as in claim 11, wherein said method is further comprised of the step of:

placing an additional layer of a hold-out varnish substantially between said print graphics layer and said over-print varnish layer.

16. The method, as in claim 15, wherein said hold-out varnish layer is applied at a coat weight of approximately 1 pound per 1000 ft$^2$.

17. The method, as in claim 16, wherein said hold-out layer is press-applied with a printing press.

18. The method, as in claim 11, wherein said surface treating step is further comprised of the step of:

surface treating by successive densification and polishing by calendering.

* * * * *